United States Patent [19]

King et al.

[11] Patent Number: 5,575,659
[45] Date of Patent: Nov. 19, 1996

[54] DOCUMENT INTERPRETING SYSTEMS

[75] Inventors: Reginald A. King, Shrivenham; Kathleen M. Aitken, Swindon, both of England

[73] Assignee: Scanna Technology Limited, London, England

[21] Appl. No.: 107,760

[22] PCT Filed: Feb. 20, 1992

[86] PCT No.: PCT/GB92/00302

§ 371 Date: Aug. 20, 1993

§ 102(e) Date: Aug. 20, 1993

[87] PCT Pub. No.: WO92/15077

PCT Pub. Date: Sep. 3, 1992

[30] Foreign Application Priority Data

Feb. 22, 1991 [GB] United Kingdom ............... 9103768

[51] Int. Cl.$^6$ ................................................. G09B 5/00
[52] U.S. Cl. .................... 434/467; 434/178; 434/308; 434/309
[58] Field of Search ................................. 434/308, 309, 434/311, 312, 313, 317, 322, 323, 327–330, 335, 167, 178

[56] References Cited

U.S. PATENT DOCUMENTS

| 4,403,965 | 9/1983 | Hawkins | 434/327 |
|---|---|---|---|
| 4,448,837 | 5/1984 | Ikeda et al. | 428/215 |
| 4,664,634 | 5/1987 | Cutler et al. | 434/311 |
| 4,697,048 | 9/1987 | Clements et al. | 178/18 |
| 4,884,974 | 12/1989 | DeSmet | 434/317 |
| 5,059,126 | 10/1991 | Kimball | 434/317 X |
| 5,174,759 | 12/1992 | Preston et al. | 434/317 |

FOREIGN PATENT DOCUMENTS

| 0383304 | 8/1990 | European Pat. Off. . |
| 2115587 | 9/1983 | United Kingdom . |
| WO84/02995 | 8/1984 | WIPO . |
| WO87/06752 | 11/1987 | WIPO . |
| WO90/15402 | 12/1990 | WIPO . |
| WO91/07715 | 5/1991 | WIPO . |

*Primary Examiner*—Richard J. Apley
*Assistant Examiner*—Glenn E. Richman
*Attorney, Agent, or Firm*—Jacobson, Price, Holman & Stern, PLLC

[57] ABSTRACT

A document interpreting system comprises a graphics tablet on which a stack of documents, e.g., a book, to be interpreted are stacked, a pointer associated with the graphics tablet and operable through the stack of documents whereby the co-ordinates of an area of the topmost document to which the pointer is directed may be determined, speech storage typically in the form of a compact disc, for storing speech relating to the different areas of the documents being interpreted and speech reproduction meas, typically in the form of a compact disc player for reproducing speech relating to an area of the topmost document to which the pointer is directed.

12 Claims, 4 Drawing Sheets

DOCUMENT INTERPRETING SYSTEMS

This invention relates to document interpreting systems and is especially applicable to such systems for assisting learning of reading or pronunciation or understanding of words, phrases or sentences or interpretation of drawings, pictures, etc. It should be understood that the term "document" covers any printed matter or indeed any written or drawn matter, and in particular includes books.

For effective learning, particularly of language, it is most helpful for a student to have the advantage of considerable attention, if not full time attention, of a teacher. For example, a young child will often learn to read by looking at a book containing pictures and corresponding words with an adult reading the words as the child follows the words and looks at the associated pictures. Thus the mind of the child is focusing on an image depicting something, is being given the spoken word and is seeing the written word. Furthermore, from the context the child is absorbing the word within the scope of a grammatical structure and is gathering the meaning, either from the pictures if relevant or with the aid of an explanation. At any stage the teacher can discuss with the child any word or its meaning or draw to the child's attention a similar word and provide explanations and definitions of grammar and meaning, i.e. syntax and semantics.

Similarly, when a child is beginning to read, the adult can monitor the reading and provide immediate feedback on a one-to-one basis to maximise the rate at which the child gains reading skills and remembers vocabulary. The interest and motivation of the child can be maintained at high levels.

However, apart from a domestic situation, the cost of such teaching techniques make them prohibitive, yet there is a very substantial need for such additional support, particularly in the areas of adult illiteracy, foreign language teaching and remedial language teaching.

Furthermore, similar needs for feedback and flexible recapitulation of concepts, explanations and facts are needed in many other areas of education including mathematics and other science subjects. The availability to a student, of a teacher who can be requested to repeat an explanation, elaborate on some point of commentary or deal with any other relevant question is an extremely valuable resource in many situations.

It is known to assist students with e.g. tape recordings of an explanation. When such recordings are applied to the process of learning to read, a simple system is one in which a tape recording of a printed work is given to a student and the student has the opportunity of following the words, repeating segments of the tape recording and indeed recording his or her own attempts at reading the words and comparing with the tape recordings of the tutor. However, such a system is inflexible and hard to operate.

One published approach to the teaching of language is contained in PCT International publication number WO83/02188 (Merit Bond Ltd.) wherein printed text is provided with bar codes associated with at least some of the text, a manually controlled reading device being used to access the bar codes as the user may require, and an electronic processing means used to cause the apparatus to synthesise voice reproduction corresponding to the text with which the selected bar code is associated. Such a device has limitations in terms of functions fulfilled and in the special preparation required of the printed material, i.e. it cannot be used with conventional books.

Another published approach (PCT WO87/06752) in the teaching of language is one in which sets of bar codes are arranged on respective lines corresponding to lines of printed text, each bar code set when accessed causing a particular storage location from a message store to be accessed to be reproduced by a speech producer. The limitations of such a system are that a book cannot be used in its original format, since bar codes have to be added or overprinted onto the original document at the expense of text. Further, the selection of the bar code set may lead to confusion and small children may have difficulty scanning a bar code.

The present invention is directed to a document interpretation system which overcomes the above limitations and provides for a practical and useful device which eliminates the need for specially printed codes associated with the words and phrases of the written material and enables a wide variety of normal books to be used.

According to the present invention there is provided a document interpreting system comprising location detecting means on which a plurality of documents to be interpreted may be stacked and for detecting through said documents the location of pointing means associated with said location detecting means and directed at an area of the topmost document of said stack, speech storage means for storing speech relating to different areas of said documents, and speech reproduction means for reproducing speech stored in said speech storage means corresponding to the area of said topmost document to which said pointing means is directed.

Such a system enables, for example, a user to point to any part of a document which is being read and to obtain a spoken version of any text e.g. words, phrases, sentences, etc. in the vicinity of the pointer or a spoken description of any picture in said area. It would also be possible for the spoken version or description to be in a foreign language thereby assisting foreign language learning. It is to be noted that the document being read may be in its original form and does not require any additional matter, e.g. bar codes, for its interpretation.

In carrying out the invention it may be arranged that said location detecting means comprises co-ordinate detection means for affording an output corresponding to the co-ordinate location of said pointing means on said topmost document, and conveniently said co-ordinate detection means may comprise a graphics tablet.

It may be arranged that said pointing means is coupled magnetically through said documents to said location detecting means for detecting the location of said pointing means, or is capacitively coupled through said documents to said location detecting means for detecting the location of said pointing means.

It may also be arranged that said pointing means is electrically connected to said location detecting means or is remotely connected to said location detecting means.

In a preferred system in accordance with the present invention, said speech storage means comprises a compact disc store, and said speech reproduction means comprises a compact disc player.

In carrying out the preferred system according to the invention, storage means may be provided for storing the data addresses of the speech signals stored in said compact disc store, and microprocessor means may be provided operable for outputting to said compact disc store the data address corresponding to an output of said co-ordinate detector means which corresponds to an area of said document to which said pointing means is directed, whereby a speech signal corresponding to said area is caused to be reproduced by said compact disc player.

Advantageously, said storage means comprises a random access memory which conveniently may take the form of a removable card.

An exemplary embodiment of the invention will now be described reference being made to the accompanying drawings, in which.

Figure 1:
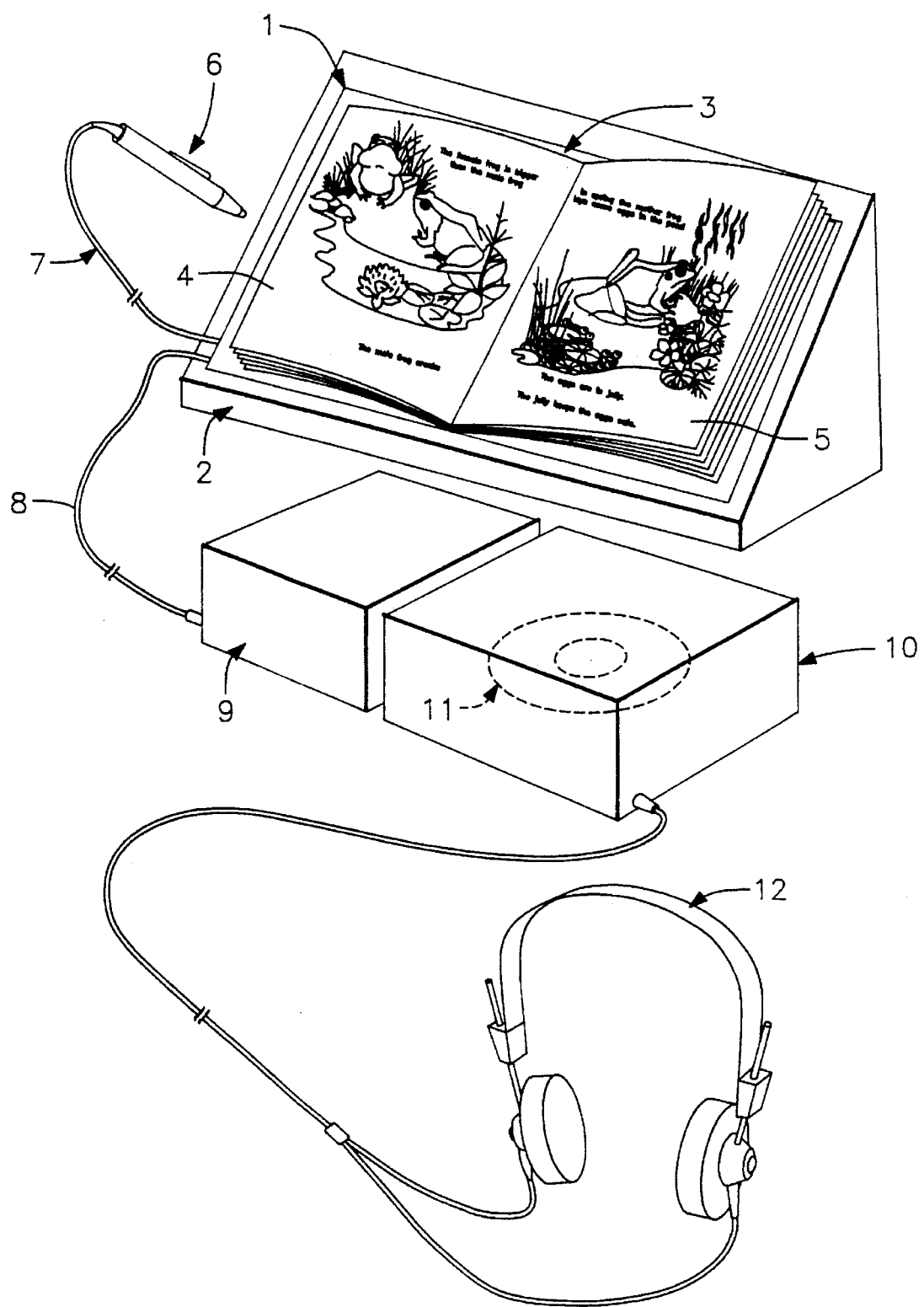
FIG. 1 is a diagrammatic representation of a document interpretation system in accordance with the present invention.

The document interpretation system depicted in FIG. 1 of the drawings comprises a graphics tablet 1 which is conveniently fixed to a reading stand or desk 2 and on which is positioned an open book 3, the topmost pages 4 and 5 of which are to be read by a user (not shown) of the system. The graphics tablet 1 is provided with a graphics tablet pen or pointer 6 which is connected to it by means of a cable 7. The pointer 6 is adapted to be pointed at an area of the topmost pages 4 and 5 of the book 3 on the graphics tablet 1, and enables the co-ordinate location of that area to be determined by the graphics tablet 1, the pointer 6 being, for example, magnetically or capacitively coupled to the graphics tablet 1 through the many pages of the book 3. The graphics tablet 1 and pointer 6 may be of conventional form, for example, as marketed under the trade mark "GRAFPAD" by BRITISH MICRO of Penfold Works, Imperial Way, Watford, England.

The output from the graphics tablet 1, consisting of the co-ordinate details of an area of the pages 4 and 5 to which the pointer 6 is directed, is fed, by means of a cable 8, to a processing interface module 9 which is itself connected to a compact disc player 10, containing a compact disc 11 on which is recorded speech signals relating to the different areas of each of the pages of the book 3- The compact disc player 10 is provided with headphones 12 or other speech reproducing means whereby a selected speech signal on the compact disc 11 may be heard by a user of the system.

It will be appreciated by those skilled in the art that the location of the book 3 or other document to be read, relative to the graphics tablet 1, may be established by, for instance, physical means such as beading to ensure the document is placed in a known location on the graphics tablet 1. Alternatively, the book 3 or other document may be placed on the graphics tablet 1 in any orientation and known features such as corners of the document may be registered by pointing at them with the pointer 6 in an initialising registration procedure. By this method the location of the words and pictures, etc. may be calculated by such known means as simple co-ordinate geometry routines.

In use of the system thus far described, a user points the pointer 6 at an area of the topmost pages 4 or 5 of the book 3, e.g. some printed text or a picture, and the graphics tablet 1 outputs the co-ordinates of that area to the interface module 9. The interface module 9 converts the co-ordinates of the indicated area into address signals for the compact disc player 10 which is thereby caused to reproduce a speech signal through the headphones 12 corresponding to the printed text pointed to on the book 3 or alternatively corresponding to the picture pointed to on the book 3.

The user of the system can access a button or switch either on the stylus or, for example, on the interface module 9 to give a real voice replay of individual words when touched by the pointer 6. Alternatively, another button may be provided e.g. on the interface module 9 which when accessed causes reproduction of the whole sentence when the first or any word in that sentence is touched by the pointer 6. Another button may be provided which when accessed allows the user to receive prompts, such as a suggestion to look for syllables within the word selected or the system can be set up to sound out the word phoneme by phoneme. A further button may be provided which, when accessed by the user, will give an explanation of the word or picture which may be in terms of its definition, mode of usage or other commentary.

Some means may also be provided for inputting the page number of the topmost document being interpreted. This may take the form of corresponding input controls on the interface module 9 or some automatic means of page identification may be used.

The system may also be used for teaching a second language, in which case, for example, a sentence can be reproduced in both languages in the correct idiom for each language using two different buttons, e.g. on the interface module 9. Each word can also be represented in each language, word for word, by the selection of an appropriate button. Where complex multi-syllable foreign words are being taught, the word may be represented both in its normal presentation at normal diction speed and also by a further selection at a slowed down speed enabling the student to dissect the pronunciation of the word, syllable by syllable.

Some examples of the use of the system described with reference to FIG. 1 will now be described with reference to FIG. 2 which depicts the pages 4 and 5 of the book 3 of FIG. 1 in greater detail.

Figure 2:
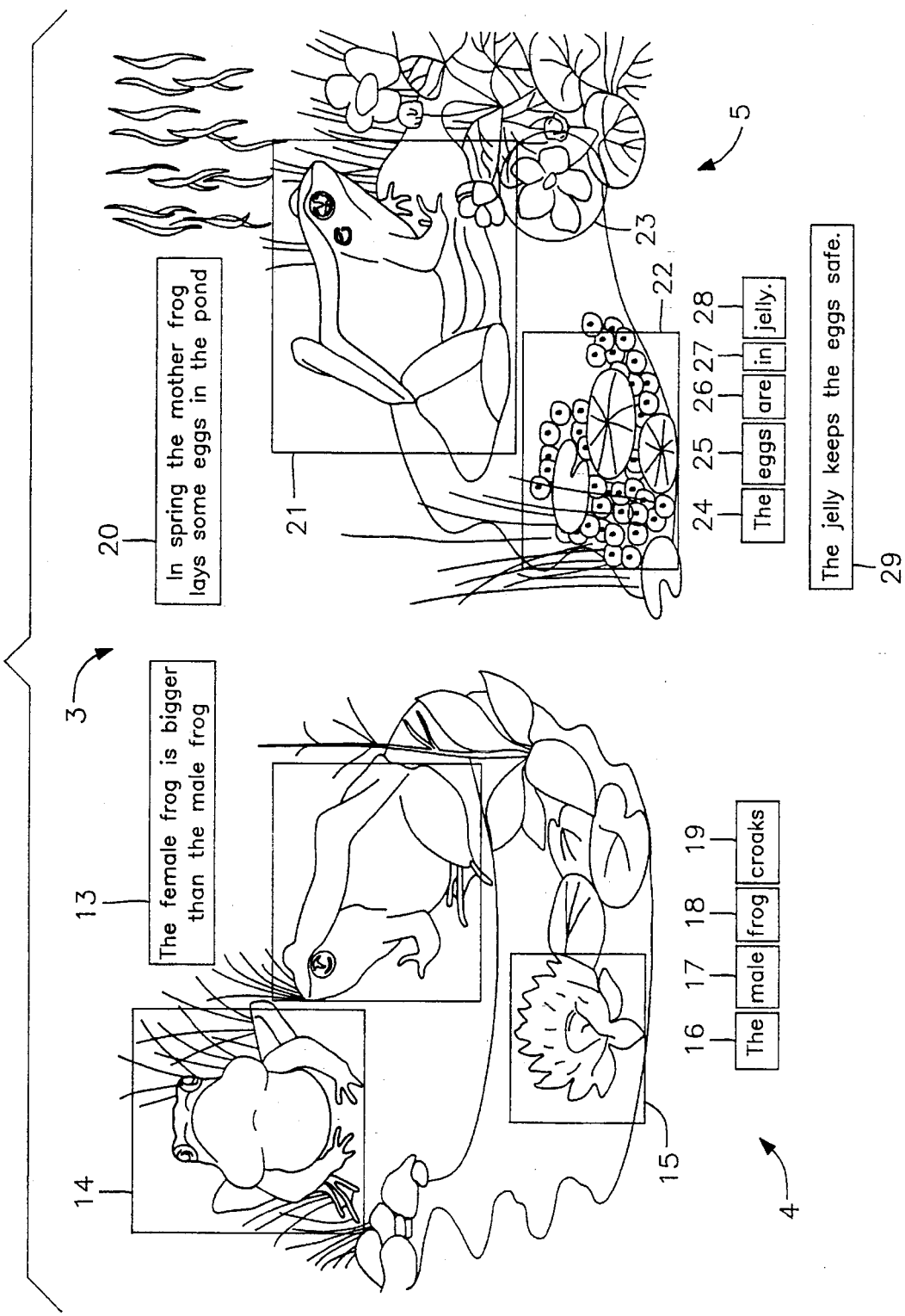
FIG. 2 depicts in greater detail the open pages of the book shown in FIG. 1 which is useful in explaining the operation of the system of FIG. 1.

Referring to FIG. 2, using the pointer 6 of FIG. 1 to point in rectangular area 13 would cause the phrase "The female frog is bigger than the male frog" to be reproduced. Pointing in area 14 may cause the phrase "I am a male frog croaking" to be reproduced. Similarly, pointing in area 15 may cause "This is a water lily" to be reproduced.

Pointing in each of the areas 16 to 19 may cause the individual words "The" "male" "frog" "croaks" respectively to be reproduced.

Similarly, for areas 20 to 28 on page 5 of the book 3.

It should be appreciated that the rectangular areas referred to in FIG. 2 are used by way of example only and other shaped areas, such as the circular area 23 on page 5, may be used.

Figure 3:
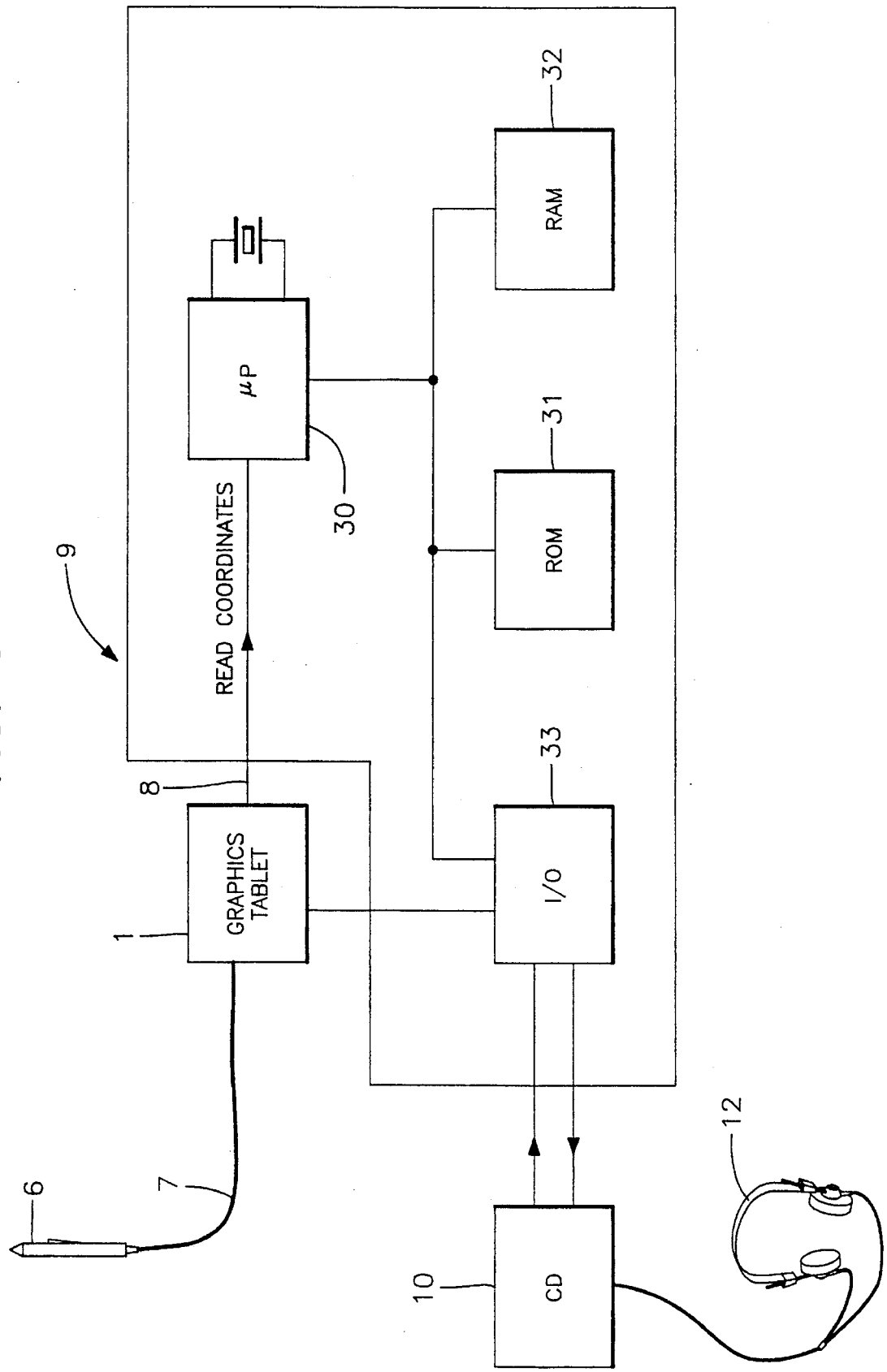
FIG. 3 is a block schematic diagram of the document interpretation system of FIG. 1.

In FIG. 3 of the drawings, there is shown a block schematic diagram relating to the document interpretation system of FIG. 1. This comprises the graphics tablet 1 to which is connected the pointer 6 via the cable 7. The graphics tablet 1 affords an output 8 to the processing interface module 9, which is itself connected to the compact disc (CD) player 10 having the headphones 12 connected to it.

The processing interface module 9 typically comprises a microprocessor 30 which operates under the control of a program stored in a read only memory (RUM) 31 and receives the co-ordinate details via output 8 from the graphics table 1. A random access memory (RAM) 32 is provided in which is stored the data addresses of the speech signals corresponding to the various areas of the document being read, e.g. the book 3, stored on the compact disc (not shown) contained in the compact disc player 10. The microprocessor 30 outputs the data address to the compact disc player 10, via input/output (I/O) interface 33 which causes the speech signal stored at the particular address on the compact disc to be reproduced in the headphones 12.

It is envisaged that the random access memory 32 may take the form of a removable RAM-card in which the various compact disc data addresses are stored corresponding to the different areas of the book 3, thereby enabling a compact disc and associated RAM-card relating to a particular book or other document to be sold as a package.

Figure 4:
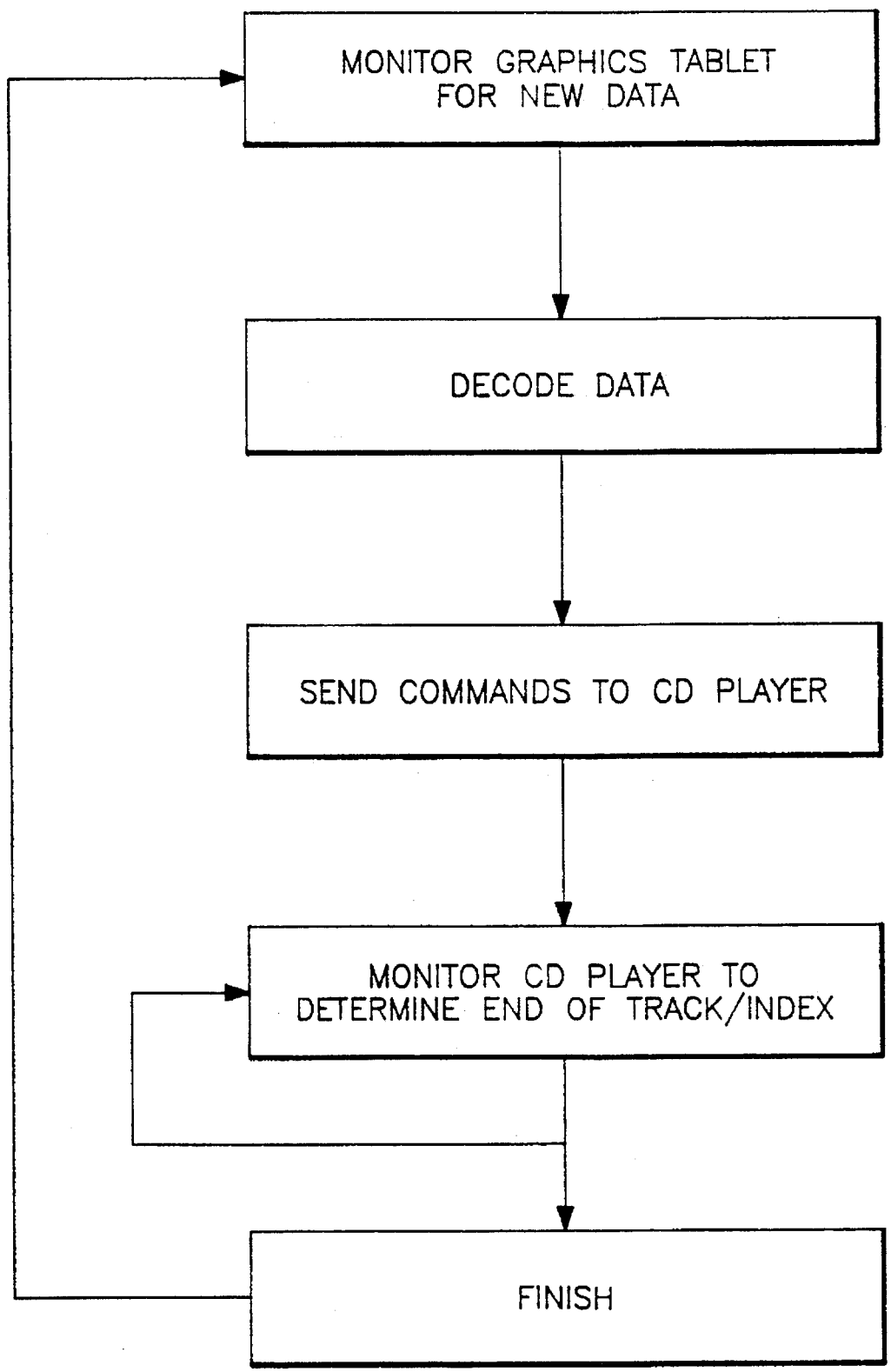
FIG. 4 is a flow diagram relating to the document interpretation system of FIGS. 1 and 3.

In FIG. 4 of the drawings there is shown a flow diagram of a typical operating system for the arrangement depicted in FIG. 3. The microprocessor 30 monitors the graphics tablet 1 for new data. The new data is decoded to obtain the corresponding data address of the compact disc player 10. The data address is output to the compact disc player 10, the output of which is monitored by the microprocessor 30 via the I/O interface 33 to determine the conclusion of the speech signals corresponding to the selected data address. The system is then ready for re-use.

It will be appreciated that new documents, or locally generated documents, e.g. flash cards and picture stories, may have their textual and pictorial co-ordinates recorded by means similar to that of FIG. 1 with the system operating in a "writing" mode. In this mode the co-ordinates of individual words, pictures, phrases, etc. are read, via the pointer 6, from documents placed on the graphics tablet 1 by the program in the read only memory 31 (FIG. 3). These co-ordinates are then converted into the corresponding data addresses of the related speech stored on the compact disc player 10 and are then stored in the random access memory 32 for subsequent use in the "reading" mode described above.

The document interpreting system which has been described is advantageous in that it enables normal printed or written documents, in individual or book form, to be "read" without special overprinting of bar codes, magnetic codes, etc. The system makes use of a pointer which can operate through a stack of documents making it eminently suitable for reading from books. Compact discs and associated RAM-cards may also be sold as a package in respect of particular books for use by teachers, pupils, etc. on equipment in many different locations.

It should be appreciated that the document interpreting system which has been described has been given by way of example only and various modifications may be made dependent upon any particular application. For example, the graphics tablet 1 and associated pointer 6 may take any convenient form which enables the co-ordinates of the pointer 6 to be determined through a stack of documents. Although the pointer 6 has been shown as being connected to the graphics tablet 1 by means of the cable 7, it may be remotely connected to it using, for example, an infra-red, radio or other link. Also although the use of a compact disc in conjunction with a compact disc player has been described, other speech storage systems e.g. using tape or solid state stores may be used.

We claim:

1. A document interpreting system comprising a document support member, location detecting means incorporated in said document support member and on which in use a plurality of documents to be interpreted are stacked, electronic pointing means coupled to said location detecting means and adapted in use to be directed at any arbitrary single point on the topmost document of said stack, said location detecting means being arranged to detect electronically through said stack the location of the arbitrary point on said topmost document to which said pointer means is directed, speech storage means for storing speech relating to different points on each of said documents, and speech reproduction means responsive to said location detecting means for reproducing speech stored in said speech storage means corresponding to the said single point on said topmost document to which said pointing means is directed.

2. A system as claimed in claim 1, in which said location detecting means comprises co-ordinate detection means which affords an output corresponding to the co-ordinate location of said pointing means on said topmost document.

3. A system as claimed in claim 2, in which said co-ordinate detection means comprises a graphics tablet.

4. A system as claimed in claim 1, in which said pointing means is coupled magnetically through said documents to said location detecting means for detecting the location of said pointing means.

5. A system as claimed in claim 1, in which said pointing means is capacitively coupled through said documents to said location detecting means for detecting the location of said pointing means.

6. A system as claimed in claim 1, in which said pointing means is electrically connected to said location detecting means.

7. A system as claimed in claim 1, in which said pointing means is remotely connected to said location detecting means.

8. A system as claimed in claim 2, in which said speech storage means comprises a compact disc store, and said speech reproduction means comprises a compact disc player.

9. A system as claimed in claim 8, comprising storage means for storing the data addresses of the speech signals stored in said compact disc store, and microprocessor means operable for outputting to said compact disc store the data address corresponding to an output of said co-ordinate detector means which corresponds to an area of said document to which said pointing means is directed whereby a speech signal corresponding to said area is caused to be reproduced by said compact disc player.

10. A system as claimed in claim 9, in which said storage means comprises a random access memory.

11. A system as claimed in claim 10, in which said random access memory is in the form of a removable card.

12. A document interpreting system comprising a document support member, location detecting means incorporated in said document support member and on which in use a plurality of documents to be interpreted are stacked, electronic pointing means coupled to said location detecting means and adapted in use to be directed at any arbitrary single point on the topmost document of said stack, said location detecting means being arranged to detect electronically through said stack the location of said arbitrary point on said topmost document to which said pointer means is directed, speech storage means for storing speech relating to different points on each of said documents, data storage means for storing the addresses of the speech signals stored in said speech storage means, microprocessor means to which the output from said location detecting means is applied for outputting to said speech storage means the data address corresponding to an output of said location detecting means which corresponds to the said single point on said document to which said pointing means is directed and speech reproduction means operable under the control of said microprocessor means for reproducing speech stored in said speech storage means at the said output data address.

\* \* \* \* \*

US005575659C1

(12) EX PARTE REEXAMINATION CERTIFICATE (5018th)
United States Patent
King et al.

(10) Number: US 5,575,659 C1
(45) Certificate Issued: Nov. 16, 2004

(54) DOCUMENT INTERPRETING SYSTEMS

(75) Inventors: Reginald A. King, Shrivenham (GB); Kathleen M. Aitken, Swindon (GB)

(73) Assignee: Leapfrog Enterprises, Inc., Emeryville, CA (US)

Reexamination Request:
No. 90/006,828, Oct. 23, 2003

Reexamination Certificate for:
Patent No.: 5,575,659
Issued: Nov. 19, 1996
Appl. No.: 08/107,760
Filed: Aug. 20, 1993

(22) PCT Filed: Feb. 20, 1992

(86) PCT No.: PCT/GB92/00302
§ 371 (c)(1),
(2), (4) Date: Aug. 20, 1993

(87) PCT Pub. No.: WO92/15077
PCT Pub. Date: Sep. 3, 1992

(30) Foreign Application Priority Data

Feb. 22, 1991 (GB) .............................................. 9103768

(51) Int. Cl.$^7$ ................................................. G09B 5/00
(52) U.S. Cl. ....................... 434/167; 434/178; 434/308; 434/309
(58) Field of Search ................................. 434/308, 309, 434/167, 178, 311, 312, 313, 317, 322, 323, 327–330, 335, 307 R, 318, 169, 185, 362, 365

(56) References Cited

U.S. PATENT DOCUMENTS

| | | |
|---|---|---|
| 4,136,336 A | 1/1979 | Abe et al. |
| 4,273,538 A | 6/1981 | Ross |
| 4,403,965 A | 9/1983 | Hawkins |
| 4,448,837 A | 5/1984 | Ikeda et al. |
| 4,456,787 A | 6/1984 | Schlosser et al. |

(List continued on next page.)

FOREIGN PATENT DOCUMENTS

| | | |
|---|---|---|
| EP | 0383304 A2 | 8/1990 |
| GB | 2115587 A | 9/1983 |
| JP | 52-137929 A | 11/1977 |
| JP | 56-038295 A | 4/1981 |
| JP | 57-181896 A | 11/1982 |
| JP | 58-121467 A | 7/1983 |
| JP | 62-077625 A | 4/1987 |
| JP | 63-018192 A | 4/1988 |

(List continued on next page.)

OTHER PUBLICATIONS

"Electronic Teach Me Reader™: A complete learning program that teaches your child to read;" *Instructions;* 1986; 4 pages; Playskool, Inc.; Pawtucket, Rhode Island.

"My Talking Computer™: Complete LEARN–FOR–FUN™ System;" *Parent Guide Instruction Manual;* 1986; pp. 1–10; Coleco Industries, Inc.; West Hartford, Connecticut.

"Reading Library i™ and Reading Library II™ educational expansion packs for the Super Speak & Read™ educational product;" *A Parent's Instruction and Operation Guide;* 1990; pp. 1–12; Texas Instruments Incorporated; USA.

"Super Speak & Read™ educational product;" *A Parent's Instruction and Operation Guide;* 1990; pp. 1–19; Texas Instruments Incorporated; USA.

Lynch, Priscilla; "Helping Your Child Learn to Read;" *A Parent Guide;* 1985; pp. 1–14; Playskool Inc.; Springfield, Massachusetts.

*Primary Examiner*—Joe H. Cheng

(57) ABSTRACT

A document interpreting system comprises a graphics tablet on which a stack of documents, e.g., a book, to be interpreted are stacked, a pointer associated with the graphics tablet and operable through the stack of documents whereby the coordinates of an area of the topmost document to which the pointer is directed may be determined, speech storage typically in the form of a compact disc, for storing speech relating to the different areas of the documents being interpreted and speech reproduction meas, typically in the form of a compact disc player for reproducing speech relating to an area of the topmost document to which the pointer is directed.

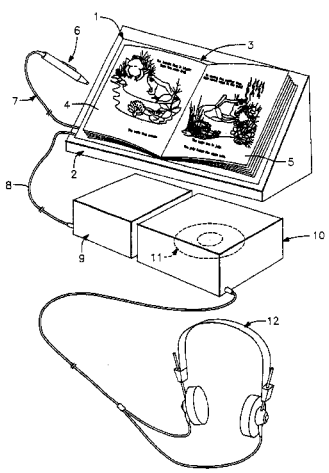

U.S. PATENT DOCUMENTS

| | | |
|---|---|---|
| 4,649,232 A | 3/1987 | Nakamura |
| 4,661,656 A | 4/1987 | Rodgers et al. |
| 4,664,634 A | 5/1987 | Cutler et al. |
| 4,681,548 A | 7/1987 | Lemelson |
| 4,697,048 A | 9/1987 | Clements et al. |
| 4,802,092 A | 1/1989 | Harte |
| 4,818,827 A | 4/1989 | Ipcinski et al. |
| 4,853,493 A | 8/1989 | Schlosser |
| 4,884,974 A | 12/1989 | DeSmet |
| 4,987,424 A | 1/1991 | Tamura et al. |
| 5,059,126 A | 10/1991 | Kimball |
| 5,088,928 A | 2/1992 | Chan |
| 5,174,759 A | 12/1992 | Preston et al. |
| 5,644,321 A | 7/1997 | Benham |
| 5,670,886 A | 9/1997 | Wolff et al. |

FOREIGN PATENT DOCUMENTS

| | | |
|---|---|---|
| WO | WO 84/02995 A1 | 8/1984 |
| WO | WO 87/06752 A1 | 11/1987 |
| WO | WO 90/15402 A1 | 12/1990 |
| WO | WO 91/07715 A2 | 5/1991 |
| WO | WO 95/12187 A1 | 5/1995 |

US 5,575,659 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–12 is confirmed.

New claims 13–68 are added and determined to be patentable.

13. *The document interpreting system of claim 1 further comprising an automatic page identification mechanism for automatically identifying the topmost document.*

14. *The document interpreting system of claim 1 further comprising a mechanism for entering the page number of the topmost document.*

15. *The document interpreting system of claim 1 wherein the topmost document comprises a sentence and wherein the system is adapted to reproduce the whole sentence when the first word or any word in the sentence is touched by the pointing means.*

16. *The document interpreting system of claim 1 wherein the system is adapted to teach a first and a second language, wherein the topmost document comprises a sentence, and wherein the sentence can be reproduced by the speech reproduction means in both the first and the second languages.*

17. *The document interpreting system of claim 1 wherein the topmost document comprises a picture, and wherein the speech storage means comprises commentary about the picture.*

18. *The document interpreting system of claim 1 wherein the topmost document comprises a word, and wherein the speech storage means comprises a definition of the word.*

19. *The document interpreting system of claim 1 wherein the documents are pages in a book.*

20. *The document interpreting system of claim 1 wherein the topmost document comprises a word, and wherein the system is adapted to allow a user to cause the speech reproduction means to reproduce the word syllable by syllable.*

21. *The document interpreting system of claim 1 wherein the documents are pages in a book and wherein the speech storage means is a removable storage device.*

22. *The document interpreting system of claim 1 wherein the system comprises a writing mode in which speech is recorded.*

23. *The document interpreting system of claim 1 wherein the system comprises a writing mode in which speech is recorded, wherein the speech is recorded for a particular word or picture, and wherein the system further comprises a reading mode where the recorded speech is played back after selecting the word or the picture with the pointing means.*

24. *The document interpreting system of claim 1 further comprising a cable coupled to the pointing means.*

25. *The document interpreting system of claim 1 further comprising a set of headphones coupled to the document support member.*

26. *The document interpreting system of claim 1 wherein the system is adapted to prompt the user.*

27. *The document interpreting system of claim 1 wherein the plurality of documents comprise cards.*

28. *The document interpreting system of claim 1 wherein the system is adapted to prompt the user to look for a syllable in a word on the topmost document.*

29. *The document interpreting system of claim 1 further comprising a physical structure, which ensures that the plurality of documents is correctly registered on the document support member.*

30. *The document interpreting system of claim 1 wherein the documents are pages in a book and wherein the topmost document comprises a picture.*

31. *The document interpreting system of claim 1 wherein the topmost document comprises words and wherein the system provides for the replay of the individual words when touched by the pointing means.*

32. *The document interpreting system of claim 1 wherein the pointing means is magnetically coupled to the location detecting means.*

33. *The document interpreting system of claim 1 wherein the system includes a first operational mode with a normal dictation speed and a second operational mode with a second dictation speed.*

34. *The document interpreting system of claim 1 wherein the system includes a mechanism for the user to identify the topmost document to the location detection means.*

35. *The document interpreting system of claim 1 wherein the topmost document comprises a predefined printed area that that surrounds one or more words.*

36. *The document interpreting system of claim 1 wherein the topmost document comprises a predefined printed area, and wherein an entire sentence is recited by the speech reproduction means after the predefined printed area is selected.*

37. *The document interpreting system of claim 1 wherein the topmost document comprises words in a story.*

38. *The document interpreting system of claim 1 wherein the topmost document comprises a word and wherein the system is adapted to sound out the word phoneme by phoneme.*

39. *The document interpreting system of claim 1 further comprising an automatic page identification mechanism for automatically identifying the topmost document, wherein the topmost document comprises a picture, and wherein the speech storage means comprises commentary about the picture.*

40. *The document interpreting system of claim 1 further comprising an automatic page identification mechanism for automatically identifying the topmost document, and wherein an entire sentence is recited by the speech reproduction means after the predefined printed area is selcted.*

41. *The document interpreting system claim 1 further comprising an automatic page identification mechanism for automatically identifying the topmost document, wherein the topmost document comprises a word, and wherein the system is adapted to sound out the word phoneme by phoneme.*

42. *The document interpreting system of claim 1 further comprising an automatic page identification mechanism for automatically identifying the topmost document, wherein the system is adapted to teach a first and a second language, wherein the topmost document comprises a sentence, and wherein the sentence can be reproduced by the speech reproduction means in both the first and the second languages.*

43. *The document interpreting system of claim 1 further comprising an automatic page identification mechanism for* automatically identifying the topmost document, wherein the system is adapted to teach a first and a second language, wherein the topmost document comprises a sentence and a word, and wherein the speech storage means comprises a definition of the word.

44. The document interpreting system of claim 1 further comprising an automatic page identification mechanism for automatically identifying the topmost document, and wherein the system is adapted to prompt the user.

45. The document interpreting system of claim 1 further comprising an automatic page identification mechanism for automatically identifying the topmost document, and further comprising a physical structure, which ensures that the document is correctly registered on the document support member.

46. The document interpreting system of claim 1 further comprising an automatic page identification mechanism for automatically identifying the topmost document, and wherein the documents are pages in a book.

47. The document interpreting system of claim 1 further comprising an automatic page identification mechanism for automatically identifying the topmost document, wherein the topmost document comprises a word, and wherein the system is adapted to allow a user to cause the speech reproduction means to reproduce the work syllable by syllable.

48. The document interpreting system of claim 1 further comprising an automatic page identification mechanism for automatically identifying the topmost document, wherein the topmost document comprises a word, wherein the system is adapted to allow a user to cause the speech reproduction means to reproduce the word syllable by syllable, and wherein the system is adapted to prompt the user.

49. The document interpreting system of claim 1 further comprising an automatic page identification mechanism for automatically identifying the topmost document, wherein the documents are pages in a book, and wherein the topmost document comprises a word and wherein the system is adapted to sound out the word phoneme by phoneme.

50. The document interpreting system of claim 1 wherein the topmost document comprises a sentence, wherein the system is adapted to reproduce the whole sentence when the first word or any word in the sentence is touched by the pointing means, wherein the system further comprises an automatic page identification mechanism for automatically identifying the topmost document, wherein the documents are pages in a book, wherein the topmost document comprises a second word and wherein the system is adapted to sound out the second word phoneme by phoneme.

51. The document interpreting system of claim 1 wherein the topmost document comprises a sentence and wherein the system is adapted to reproduce the whole sentence when the first word or any word in the sentence is touched by the pointing means, wherein the system further comprises an automatic page identification mechanism for automatically identifying the topmost document, wherein the documents are pages in a book, wherein the topmost document comprises a second word, wherein the system is adapted to sound out the second word phoneme by phoneme, wherein the system is adapted to teach a first and a second language, and wherein the sentence can be reproduced by the speech reproduction means in both the first and the second languages.

52. The document interpreting system of claim 1 wherein the documents are pages in a book, and wherein the system further comprises a cable coupled to the pointing means.

53. The document interpreting system of claim 1 wherein the documents are pages in a book, wherein the topmost document comprises a word, and wherein the system is adapted to allow a user to cause the speech reproduction means to reproduce the word syllable by syllable.

54. The document interpreting system of claim 1 wherein the documents are pages in a book, wherein the topmost document comprises a word and wherein the system is adapted to say the phonemes in the word.

55. The document interpreting system of claim 1 wherein the documents are pages in a book, wherein the topmost document comprises a picture, and wherein the speech storage means comprises commentary about the picture.

56. The document interpreting system of claim 1 wherein the documents are pages in a book, wherein the system is adapted to teach a first and a second language, wherein the topmost document comprises a sentence, and wherein the sentence can be reproduced by the speech reproduction means in both the first and the second languages.

57. The document interpreting system of claim 1 wherein the documents are pages in a book and wherein the speech storage means is a removable storage device, wherein the topmost document comprises a sentence and wherein the system is adapted to reproduce the whole sentence when the first word or any word in the sentence is touched by the pointing means.

58. The document interpreting system of claim 1 wherein the documents are pages in a book and wherein the system further comprises a mechanism for allowing the user to identify the topmost document to the location detection system.

59. The document interpreting system of claim 1 wherein the documents are pages in a book, wherein the topmost document comprises a word or a picture, wherein the system is adapted to teach a first and a second language, and wherein the word can be reproduced by the speech reproduction means in both the first and the second languages.

60. The document interpreting system of claim 59 wherein the topmost document comprises the picture.

61. The document interpreting system of claim 59 wherein the topmost document comprises the word, and wherein the speech storage means comprises a definition of the word.

62. The document interpreting system of claim 59 wherein the topmost document comprises the word, and wherein the system is adapted to allow a user to cause the speech reproduction means to reproduce the word syllable by syllable.

63. The document interpreting system of claim 59 wherein the topmost document comprises a predefined printed area that that surrounds one or more words.

64. The document interpreting system of claim 59 wherein the topmost document comprises the picture and the word, and wherein the speech storage means comprises commentary about the picture and commentary about the word.

65. The document interpreting system of claim 64 further comprising a cable coupled to the pointing means.

66. The document interpreting system of claim 65 wherein the speech storage means comprises a removable memory device.

67. The document interpreting system of claim 1 wherein the electronic pointing means comprises a stylus.

68. The document interpreting system of claim 1 wherein the speech storage means comprises a solid state device.

* * * * *